United States Patent
Tsirkin

(10) Patent No.: US 10,608,963 B2
(45) Date of Patent: Mar. 31, 2020

(54) ADJUSTING BUFFER SIZE FOR NETWORK INTERFACE CONTROLLER

(71) Applicant: Red Hat Israel, Ltd., Raanana (IL)

(72) Inventor: Michael Tsirkin, Lexington, MA (US)

(73) Assignee: Red Hat Israel, Ltd., Raanana (IL)

( * ) Notice: Subject to any disclaimer, the term of this patent is extended or adjusted under 35 U.S.C. 154(b) by 54 days.

(21) Appl. No.: 15/948,457

(22) Filed: Apr. 9, 2018

(65) Prior Publication Data
US 2018/0227249 A1     Aug. 9, 2018

Related U.S. Application Data

(63) Continuation of application No. 14/276,324, filed on May 13, 2014, now Pat. No. 9,961,023.

(51) Int. Cl.
| | |
|---|---|
| *H04L 12/861* | (2013.01) |
| *H04L 29/06* | (2006.01) |
| *H04L 12/835* | (2013.01) |
| *H04L 12/64* | (2006.01) |
| *H04L 12/879* | (2013.01) |

(52) U.S. Cl.
CPC ...... *H04L 49/9068* (2013.01); *H04L 12/6418* (2013.01); *H04L 47/30* (2013.01); *H04L 49/9005* (2013.01); *H04L 49/9026* (2013.01); *H04L 49/9052* (2013.01); *H04L 69/22* (2013.01)

(58) Field of Classification Search
None
See application file for complete search history.

(56) References Cited

U.S. PATENT DOCUMENTS

| | | |
|---|---|---|
| 6,366,959 B1 | 4/2002 | Sidhu et al. |
| 6,819,870 B1 | 11/2004 | Ge et al. |
| | (Continued) | |

FOREIGN PATENT DOCUMENTS

| | | |
|---|---|---|
| WO | 2013051975 | 4/2013 |
| WO | 2013187813 | 12/2013 |

OTHER PUBLICATIONS

Li, Tianji, et al., "Buffer Sizing for TCP Flows in 802.11e WLANs", Hamilton Institute, National University of Ireland, Maynooth, Ireland, 3 pages, http://www.hamilton.ie/tianji_li/aBDP.pdf, last accessed May 8, 2014.

Vishwanath, Arun, et al., "Perspectives on Router Buffer Sizing: Recent Results and Open Problems", University of New South Wales, Sydney, Australia; Netvvorking Research Lab, Bell Labs, Alcatel-Lucent, USA, 6 pages, http://www2.ee.unsw.edu.au/-vijay/pubs/jm1/09ccr.pdf, last accessed May 8, 2014.

(Continued)

*Primary Examiner* — Peter Chen
(74) *Attorney, Agent, or Firm* — Lowenstein Sandler LLP

(57) ABSTRACT

Systems and methods for adjusting the receive buffer size for network interface controllers. An example method may comprise: maintaining, by a computer system, a moving window referencing a pre-defined number of incoming data packets; responsive to receiving a new data packet, shifting the moving window to include the new data packet while excluding a least recently received data packet; calculating a weighted average value of sizes the incoming data packets referenced by the moving window, wherein a most recently received data packet is associated with a first weight that is higher that a second weight associated with a least recently received data packet; and adjusting, using the weighted average value, a size of a buffer allocated for incoming data packets.

18 Claims, 4 Drawing Sheets

(56) References Cited

U.S. PATENT DOCUMENTS

| | | |
|---|---|---|
| 7,307,998 B1 | 12/2007 | Wang et al. |
| 7,359,324 B1 | 4/2008 | Ouellette et al. |
| 8,089,992 B2 | 1/2012 | Chen et al. |
| 9,055,011 B2 | 6/2015 | Li et al. |
| 2003/0221295 A1* | 12/2003 | Berger .................... A44B 11/06 24/115 L |
| 2006/0206453 A1 | 9/2006 | Bande et al. |
| 2007/0002880 A1 | 1/2007 | Chien et al. |
| 2010/0020686 A1* | 1/2010 | Lee .................... H04L 41/5003 370/231 |
| 2011/0122883 A1 | 5/2011 | Pacella et al. |
| 2011/0153856 A1 | 6/2011 | Piepenbrink et al. |
| 2012/0163385 A1 | 6/2012 | Lee et al. |
| 2012/0166670 A1 | 6/2012 | Kure et al. |
| 2012/0272309 A1 | 10/2012 | Zhang et al. |
| 2013/0083654 A1 | 4/2013 | Lee et al. |
| 2018/0225151 A1* | 8/2018 | Park ...................... G06F 9/5038 |

OTHER PUBLICATIONS

"[Patch v6] Add Generic Exponentially Weighted Moving Average (EWMA) Function", lwn.net, Nov. 11, 2010, 3 pages, http://lwn.net/Articles/414823/.

USPTO, Office Action for U.S. Appl. No. 14/276,324, dated Nov. 13, 2015.

USPTO, Final Office Action for U.S. Appl. No. 14/276,324, dated May 27, 2016.

USPTO, Office Action for U.S. Appl. No. 14/276,324, dated Jun. 12, 2017.

USPTO, Advisory Action for U.S. Appl. No. 14/276,324, dated Aug. 4, 2016.

USPTO, Notice of Allowance for U.S. Appl. No. 14/276,324, dated Dec. 28, 2017.

* cited by examiner

ADJUSTING BUFFER SIZE FOR NETWORK INTERFACE CONTROLLER

RELATED APPLICATIONS

This application is a continuation of U.S. patent application Ser. No. 14/276,324 filed on May 13, 2014, titled "Adjusting Buffer Size for Network Interface Controller," the entire content of which is incorporated by reference herein.

TECHNICAL FIELD

The present disclosure is generally related to computer systems, and is more specifically related to systems and methods for adjusting the receive buffer size for network interface controllers.

BACKGROUND

Network interface controllers (NICs) implement the OSI layer 1 (physical layer) and OSI layer 2 (data link layer standards), thus providing physical access to a networking medium and a low-level addressing system using media access control (MAC) addresses, in order to allow computer systems to communicate over wired or wireless networks.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for adjusting the receive buffer size for network interface controllers. A computer system may be equipped with one or more network interface cards (NICs) providing physical access to a networking medium and a low level addressing system (e.g., using media access control (MAC) addresses), in order to allow the computer system to communicate over a wired or wireless network.

A computer system may allocate a plurality of receive buffers for storing the data packets received by a NIC. If the size of an incoming data packet is smaller than the buffer size, the buffer may be partially used. Conversely, if the size of an incoming data packet exceeds the buffer size, more than one buffer can be used to store the data packet. In both situations, the overall size of one or more memory buffers allocated for an incoming data packet would exceed the size of the data packet.

To reduce the amount of memory that may be unproductively consumed by the above described over-allocation, the buffer size may be adjusted on-the-fly based on the average size of incoming data packets. In certain implementations, a weighted average may be used to give higher weights to the most recently received data packets. However, if a considerable number of incoming packets have sizes significantly differing from the calculated average incoming packet size, a substantial amount of memory may still be over-allocated.

Aspects of the present disclosure address the above noted deficiencies by adjusting the receive buffer size based on the packet size value having a certain ordinal number in an ordered sequence of sizes of a plurality of incoming data packets. In an illustrative example, the receive buffer size may be set to equal the K-th largest data packet size among the most recently received N incoming packets, wherein K and N are positive integers. Various aspects of the above referenced methods and systems are described in details herein below by way of examples, rather than by way of limitation.

Figure 1:
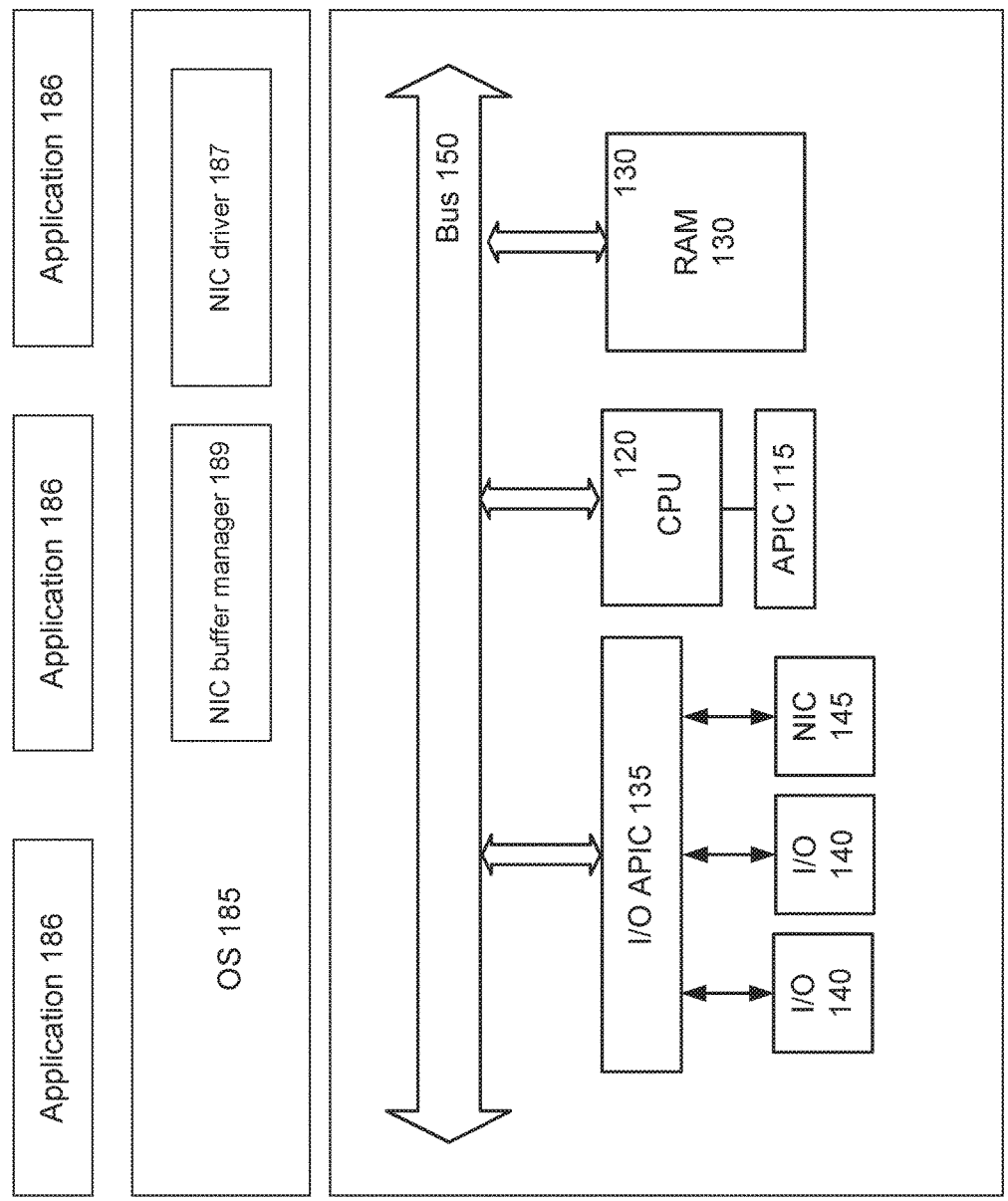
FIG. 1 depicts a high-level component diagram of an example computer system, in accordance with one or more aspects of the present disclosure.

FIG. 1 depicts a high-level component diagram of an illustrative example of a computer system 100 in accordance with one or more aspects of the present disclosure. Computer system 100 may include one or more processors 120 communicatively coupled to memory devices 130 and input/output (I/O) devices 140 via a system bus 150.

"Processor" or "processing device" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data.

In an illustrative example, an I/O device may be provided by a NIC 145. Computer system 100 may comprise a NIC driver 187 facilitating communications of operating system 185 with one or more NICs 145.

Computer system 100 may further comprise one or more Advanced Programmable Interrupt Controllers (APIC), including one local APIC 115 per processor and one or more I/O APICs 135. Local APIC 115 may receive interrupts from local sources (including timer interrupts, internal error interrupts, performance monitoring counter interrupts, thermal sensor interrupts, and I/O devices connected to the processor's local interrupt pins either directly or via an external interrupt controller) and externally connected I/O devices (i.e., UO devices connected to an I/O APIC), as well as inter-processor interrupts (IPIs). The latter may be used for software self-interrupts, interrupt forwarding or preemptive scheduling. Local APIC 115 may handle interrupts from externally connected I/O devices by the IPI message handling mechanism.

In the illustrative example of FIG. 1, computer system 100 may execute an operating system 185 and one or more applications 186. Alternatively, computer system 100 may run one or more virtual machines (not shown in FIG. 1), by executing a software layer, often referred to as "hypervisor," above the hardware and below the virtual machines. The hypervisor may abstract the physical layer, including processors, memory, and I/O devices, and present this abstraction to the virtual machines as virtual devices. A virtual machine may execute a guest operating system and one or more applications.

In certain implementations, computer system 100, responsive to receiving an interrupt from a network interface card (NIC), may invoke an interrupt handler routine to receive an incoming data frame from the NIC and write the data frame into a memory buffer. In accordance with one or more aspects of the present disclosure, computer system 100 may comprise a NIC buffer manager component 189 programmed to adjust the NIC receive buffer size, as described in more details herein below. In certain implementations, NIC buffer manager component 189 may be packaged as a component of operating system 185 executed in the kernel space, the user space, or both. While in the illustrative example of FIG. 1 NIC buffer manager component 189 is shown as a component separate from NIC driver 187, in certain implementations, functions of buffer manager component 189 may be performed by NIC driver 187.

Figure 2:
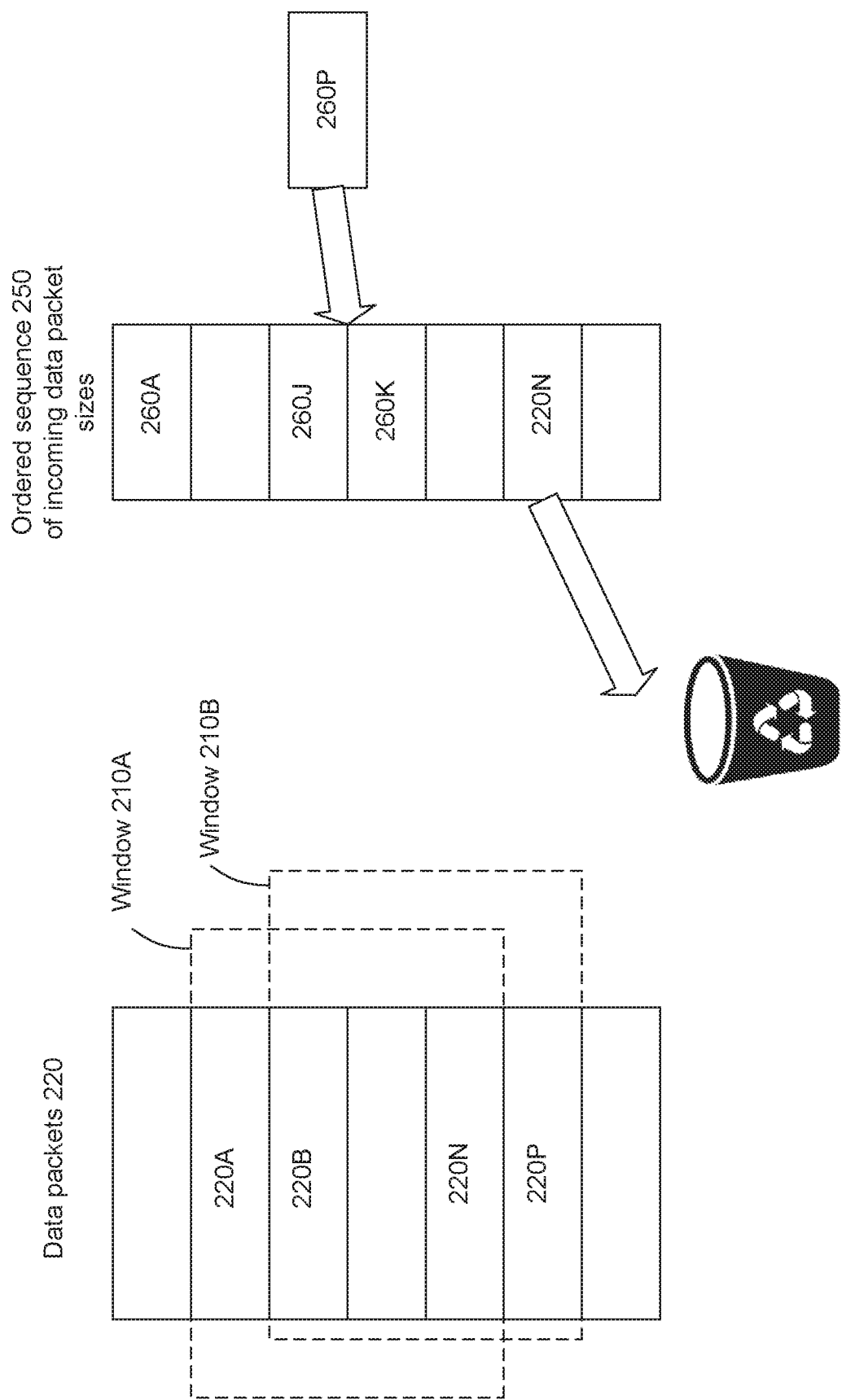
FIG. 2 schematically illustrates a moving window comprising a certain number of incoming data packets implemented by a NIC buffer manager component, in accordance with one or more aspects of the present disclosure.

FIG. 2 schematically illustrates a moving window implemented by a NIC buffer manager component, in accordance with one or more aspects of the present disclosure. Referring to FIG. 2, NIC buffer manager component 189 may implement a moving window 210 comprising a certain number of incoming data packets 220A-220N. Once an incoming data packet 220P arrives, the moving window currently positioned as window 210A may be moved to position 210B to include the newly arrived data packet 220P while excluding the least recently arrived data packet 220A.

In certain implementations, NIC buffer manager component 189 may be programmed to store an ordered sequence 250 of sizes 260 of incoming data packets 220A-220N 220 comprised by the moving window. Once an incoming data 220P packet arrives, the size 260N of the least recently arrived data packet may be excluded from the sequence, while the size 260P of the newly arrived data packet may be inserted into the sequence between the maximum value 220J not exceeding the size of the newly arrived data packet and the minimum value 220K exceeding the size of the newly arrived data packet.

The present disclosure is not limited to the insertion sorting method described herein above with references to FIG. 2, and other sorting algorithms may be implemented for sorting the array of sizes of incoming data packets in accordance with one or more aspects of the present disclosure.

In certain implementations, the moving window size may be set to include the most recently received N incoming packets, wherein N is a positive integer value. Alternatively, the receive buffer size may be set to equal the K-th largest data packet size among the incoming packets received within a certain period of time. In an illustrative example, the receive buffer size may be set to equal the K-th largest data packet size among the most recently received N incoming packets, wherein K and N are positive integers.

In certain implementations, values of K and N may be calculated to limit, by a pre-defined probability value, the statistical probability of an incoming data packet exceeding the buffer size. In an illustrative example, the receive buffer size may be set to equal the second largest data packet size among the most recently received 64 incoming packets, thus limiting by at most 2% the statistical probability of an incoming data packet exceeding the buffer size.

In certain implementations, the values of K and N may be pre-defined (e.g., as values of parameters of the operating system). Alternatively, the values of K and N may be calculated on the fly based on at least one method performance metric, such as the difference between the total size of buffers allocated for the plurality of incoming data packets and the total size of the incoming data packets.

Figure 3:
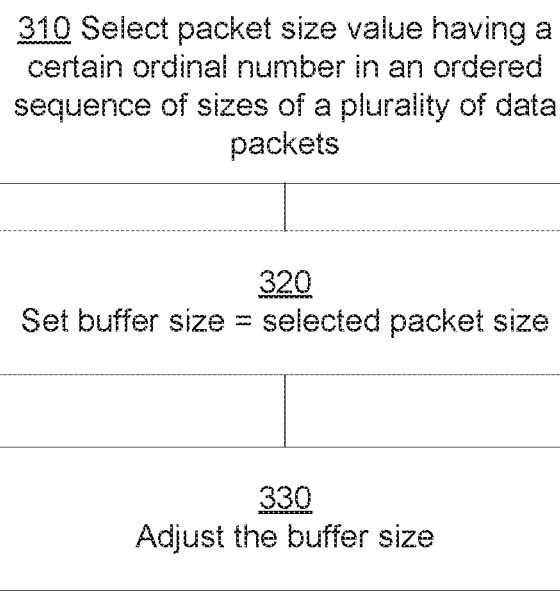
FIG. 3 depicts a flow diagram of a method for adjusting the receive buffer size for network interface controllers, in accordance with one or more aspects of the present disclosure.

FIG. 3 depicts a flow diagram of an example method 300 for adjusting the receive buffer size for network interface controllers. Method 300 may be performed by a computer system that may comprise hardware (e.g., circuitry, dedicated logic, and/or programmable logic), software (e.g., instructions executable on a computer system to perform hardware simulation), or a combination thereof. Method 300 and/or each of its individual functions, routines, subroutines, or operations may be performed by one or more processors of the computer system executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, a computer system implementing the method may select a packet size value having a certain ordinal number in an ordered sequence of sizes of a plurality of data packets received by the network interface controller. In various illustrative examples, the data packets may be provided by data link layer packets, such as Ethernet frames or Infiniband frames.

In certain implementations, the receive buffer size may be set to equal the K-th largest data packet size among the most recently received N incoming packets, wherein K and N are positive integers, as described in more details herein above.

In certain implementations, the values of K and N may be pre-defined (e.g., as values of parameters of the operating system). Alternatively, the values of K and N may be calculated on the fly based on at least one method performance metric, such as the difference between the total size of buffers allocated for the plurality of incoming data packets and the total size of the incoming data packets.

In certain implementations, the values of K and N may be calculated to limit, by a pre-defined probability value, the statistical probability of an incoming data packet exceeding the buffer size, as described in more details herein above.

At block 320, the computer system may adjust the size of a buffer associated with the network interface controller, by setting the buffer size being equal to the selected packet size value. In certain implementations, the size of the buffer may be set equal to the nearest integer value exceeding the selected packet size value. Alternatively, the size of the buffer may be set equal to the nearest integer value not exceeding the selected packet size value.

At block 330, the computer system may further adjust the size of the buffer associated with the network interface controller. In an illustrative example, the size of the buffer may be rounded to the nearest multiple of a certain integer value. In another illustrative example, the size of the buffer may be increased by a certain integer value. In another illustrative example, the size of the buffer may be limited by a certain integer value, as described in more details herein above.

Upon completing the operations referenced by block 330, the method may loop back to step 310.

Figure 4:
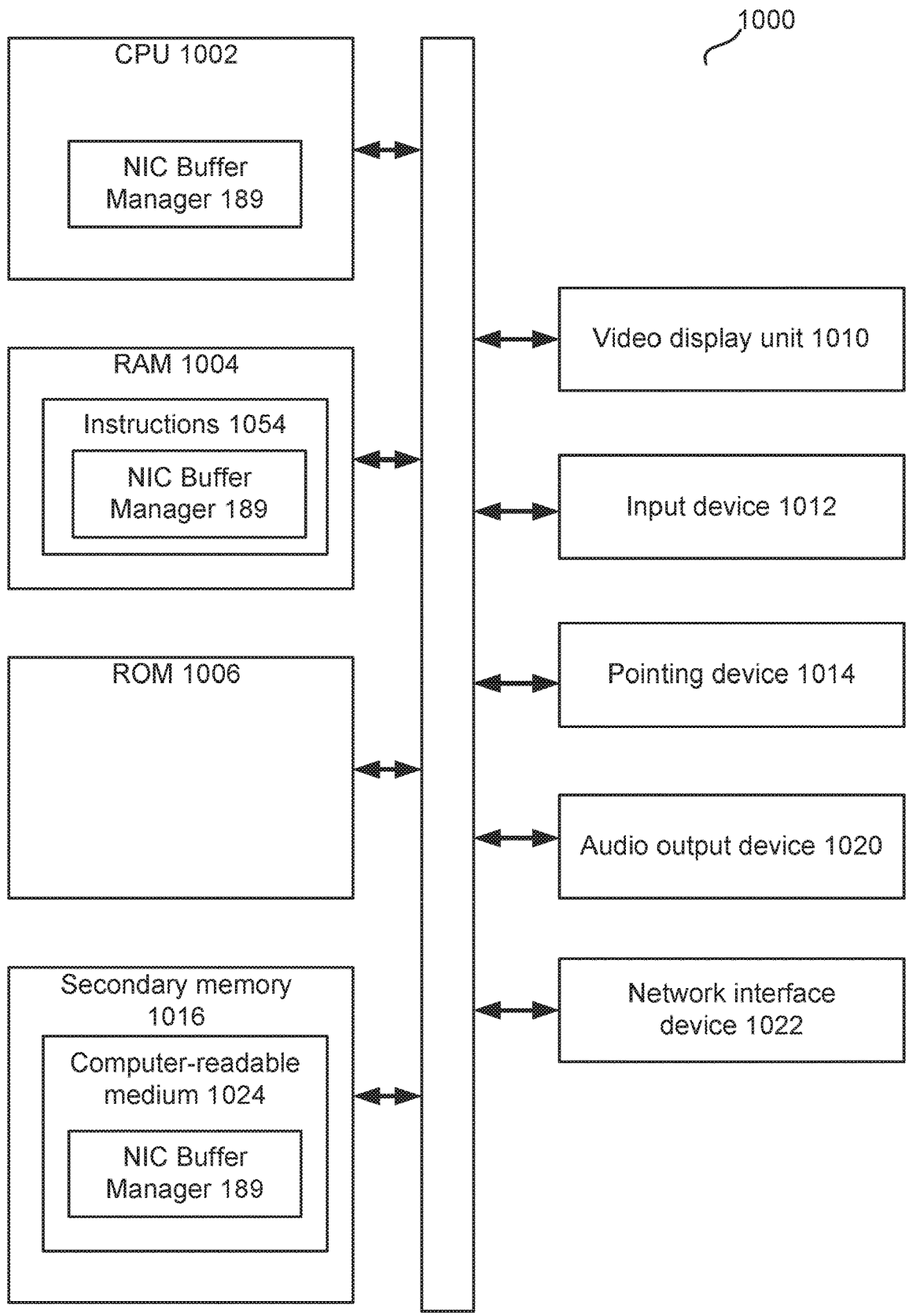
FIG. 4 depicts a block diagram of an illustrative computer system operating in accordance with examples of the invention.

FIG. 4 depicts an example computer system 1000 which can perform any one or more of the methods described herein. In one example, computer system 1000 may correspond to computer system 100 of FIG. 1.

In one example, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may include a processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

Processor 1002 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface controller 1022. Computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

Secondary memory 1016 may include a non-transitory computer-readable storage medium 1024 on which may be stored instructions 1054 encoding any one or more of the methods or functions described herein, including instructions encoding NIC buffer manager component 189 of FIG. 1 implementing method 300 for adjusting the receive buffer size for network interface controllers.

Instructions 1054 may also reside, completely or partially, within main memory 1004 and/or within processor 1002 during execution thereof by computer system 1000, hence, main memory 1004 and processor 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The invention claimed is:

1. A method, comprising:
maintaining, by a computer system, a moving window referencing a pre-defined number of incoming data packets;
responsive to receiving a new data packet, shifting, by the computer system, the moving window to include the new data packet while excluding a least recently received data packet;
calculating, by the computer system, a weighted average value of sizes incoming data packets referenced by the moving window, wherein a most recently received data packet is associated with a first weight that is higher than a second weight associated with the least recently received data packet; and
adjusting, by the computer system, using the weighted average value, a size of a buffer allocated for incoming data packets.

2. The method of claim 1, wherein adjusting the size of the buffer further comprises:
setting the size of the buffer equal to an integer value exceeding the weighted average value.

3. The method of claim 1, wherein adjusting the size of the buffer further comprises:
rounding the size of the buffer to a nearest multiple of a pre-defined integer value.

4. The method of claim 1, further comprising:
determining the pre-defined number of incoming data packets in view of a performance metric.

5. The method of claim 4, wherein the performance metric reflects a difference between a total size of buffers allocated for a plurality of incoming data packets and a total size of the plurality of incoming data packets.

6. The method of claim 1, wherein adjusting the size of the buffer is performed by a buffer manager component running in a user space of the computer system.

7. A system comprising:
a memory; and
a processing device, coupled to the memory, to:
maintain a moving window referencing a pre-defined number of incoming data packets;
responsive to receiving a new data packet, shift the moving window to include the new data packet while excluding a least recently received data packet;
calculate a weighted average value of sizes incoming data packets referenced by the moving window, wherein a most recently received data packet is associated with a first weight that is higher than a second weight associated with the least recently received data packet; and
adjust, using the weighted average value, a size of a buffer allocated for incoming data packets.

8. The system of claim 7, wherein adjusting the size of the buffer further comprises:
setting the size of the buffer equal to an integer value exceeding the weighted average value.

9. The system of claim 7, wherein adjusting the size of the buffer further comprises:
rounding the size of the buffer to a nearest multiple of a pre-defined integer value.

10. The system of claim 7, wherein the processing device is further to:
determining the pre-defined number of incoming data packets in view of a performance metric.

11. The system of claim 10, wherein the performance metric reflects a difference between a total size of buffers allocated for a plurality of incoming data packets and a total size of the plurality of incoming data packets.

12. The system of claim 8, wherein adjusting the size of the buffer is performed by a buffer manager component running in a user space of the computer system.

13. A computer-readable non-transitory storage medium comprising executable instructions that, when executed by a processing device, cause the processing device to:
maintain a moving window referencing a pre-defined number of incoming data packets;
responsive to receiving a new data packet, shift the moving window to include the new data packet while excluding a least recently received data packet;
calculate a weighted average value of sizes incoming data packets referenced by the moving window, wherein a most recently received data packet is associated with a first weight that is higher than a second weight associated with the least recently received data packet; and
adjust, using the weighted average value, a size of a buffer allocated for incoming data packets.

14. The computer-readable non-transitory storage medium of claim 13, wherein adjusting the size of the buffer further comprises:
setting the size of the buffer equal to an integer value exceeding the weighted average value.

15. The computer-readable non-transitory storage medium of claim 13, wherein adjusting the size of the buffer further comprises:
rounding the size of the buffer to a nearest multiple of a pre-defined integer value.

16. The computer-readable non-transitory storage medium of claim 13, further comprising executable instructions that, when executed by the processing device, cause the processing device to:
determine the pre-defined number of incoming data packets in view of a performance metric.

17. The computer-readable non-transitory storage medium of claim 16, wherein the performance metric reflects a difference between a total size of buffers allocated for a plurality of incoming data packets and a total size of the plurality of incoming data packets.

18. The computer-readable non-transitory storage medium of claim 15, wherein adjusting the size of the buffer is performed by a buffer manager component running in a user space of the computer system.

* * * * *